United States Patent
Koo et al.

(10) Patent No.: US 10,038,388 B2
(45) Date of Patent: Jul. 31, 2018

(54) CONVERTER HAVING A LOW CONDUCTION LOSS AND DRIVING METHOD THEREOF

(71) Applicant: FAIRCHILD KOREA SEMICONDUCTOR LTD., Bucheon-si (KR)

(72) Inventors: Gwanbon Koo, Bucheon-si (KR); Youngbae Park, Bucheon-si (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 192 days.

(21) Appl. No.: 14/514,802

(22) Filed: Oct. 15, 2014

(65) Prior Publication Data

US 2015/0131341 A1  May 14, 2015

(30) Foreign Application Priority Data

Oct. 16, 2013 (KR) .................. 10-2013-0123572

(51) Int. Cl.
*H02M 3/335* (2006.01)
*H02M 1/00* (2006.01)

(52) U.S. Cl.
CPC ... *H02M 3/33569* (2013.01); *H02M 3/33561* (2013.01); *H02M 3/33523* (2013.01); *H02M 2001/0009* (2013.01); *H02M 2001/0058* (2013.01); *Y02B 70/1491* (2013.01)

(58) Field of Classification Search
CPC . H02M 2001/0032; H02M 2001/0054; H02M 3/335; H02M 3/33507; H02M 3/33523; H02M 3/33569; H02M 3/3385
See application file for complete search history.

(56) References Cited

U.S. PATENT DOCUMENTS

| | | | | |
|---|---|---|---|---|
| 6,061,257 A | * | 5/2000 | Spampinato | H02M 3/33523 363/21.13 |
| 6,069,807 A | * | 5/2000 | Boylan | H02M 3/33569 323/288 |
| 7,606,051 B1 | * | 10/2009 | Wittenbreder, Jr. | H02M 3/33576 363/21.04 |
| 2003/0179592 A1 | * | 9/2003 | Nishiyama | H02M 3/33569 363/20 |
| 2004/0057256 A1 | * | 3/2004 | Feldtkeller | H02M 3/3385 363/21.01 |
| 2005/0073862 A1 | * | 4/2005 | Mednik | H02M 3/33523 363/20 |
| 2006/0013021 A1 | * | 1/2006 | Aso | H02M 1/34 363/21.09 |
| 2006/0215424 A1 | * | 9/2006 | Aso | H02M 3/335 363/21.01 |
| 2007/0086219 A1 | * | 4/2007 | Yasumura | H02M 3/33507 363/21.02 |
| 2008/0219033 A1 | * | 9/2008 | Nishikawa | H02M 7/003 363/21.16 |
| 2010/0067259 A1 | | 3/2010 | Liu | |

(Continued)

*Primary Examiner* — Fred E Finch, III

(74) *Attorney, Agent, or Firm* — AMPACC Law Group, PLLC

(57) ABSTRACT

A converter and a driving method thereof are disclosed. The converter includes a transformer, a main switch, a clamp switch, and a switching controller. Here, the switching controller controls a turn-on time of the main switch and a turn-off time of the clamp switch corresponding to an output load.

19 Claims, 6 Drawing Sheets

(56) References Cited

U.S. PATENT DOCUMENTS

| | | | |
|---|---|---|---|
| 2010/0110734 A1* | 5/2010 | Park | H02M 3/33507 363/21.16 |
| 2010/0220504 A1* | 9/2010 | Kim | H02M 3/33507 363/21.17 |
| 2011/0194313 A1* | 8/2011 | Yoshinaga | H02M 3/33569 363/21.12 |
| 2011/0305048 A1* | 12/2011 | Yang | H02M 1/083 363/21.03 |
| 2012/0087153 A1* | 4/2012 | Bostrom | H02M 1/38 363/15 |
| 2013/0169182 A1* | 7/2013 | Park | H02M 3/33507 315/219 |
| 2013/0236204 A1* | 9/2013 | Yamaguchi | H02M 3/33507 399/88 |
| 2014/0071715 A1* | 3/2014 | Sato | H02M 3/33515 363/21.01 |
| 2014/0328090 A1* | 11/2014 | Takahashi | H02M 3/33507 363/21.17 |
| 2014/0376271 A1* | 12/2014 | Chiba | H02M 3/335 363/21.01 |
| 2014/0376273 A1* | 12/2014 | Hosotani | H02M 1/32 363/21.02 |
| 2015/0016153 A1* | 1/2015 | Orr | H02M 3/33538 363/21.04 |
| 2015/0117066 A1* | 4/2015 | Schmid | H02M 3/33523 363/21.01 |
| 2015/0130516 A1* | 5/2015 | Asai | H02M 3/33561 327/109 |

\* cited by examiner

CONVERTER HAVING A LOW CONDUCTION LOSS AND DRIVING METHOD THEREOF

CROSS-REFERENCE TO RELATED APPLICATION

This application claims priority to and the benefit of Korean Patent Application No. 10-2013-0123572 filed in the Korean Intellectual Property Office on Oct. 16, 2013, the entire contents of which are incorporated herein by reference.

BACKGROUND OF THE INVENTION (a) Field of the Invention

The present invention relates to a converter and a driving method thereof.

(b) Description of the Related Art

A converter is a circuit that converts an input voltage to a desired output voltage. Such a converter is mounted to various electronic devices a power supply.

The converter includes various types of converters, such as a boost converter, a buck converter, a flyback converter, and the like. Among them, an active clamp flyback converter has been widely used in applications that require a wide range of an input voltage and high power density.

The active clamp flyback converter further includes a clamp switch in addition to a main switch, and further includes an additional clamp capacitor. When the main switch is turned off, the clamp switch is turned on. Such an active clamp flyback converter can easily realize zero voltage switching using the clamp switch and the clamp capacitor. In a typical flyback converter, a voltage overshoot occurs due to leakage inductance of a transformer and a parasitic capacitance of the main switch at turn-off of the main switch, and a snubber circuit is used to eliminate the voltage overshoot. The active clamp flyback converter can prevent the voltage overshoot using turning-on of the clamp switch and the clamp capacitor at turn-off of the main switch without using the snubber circuit.

However, such an active clamp flyback converter has a high conduction loss, and accordingly it may not be appropriate to an application that requires ultra-high power density, like a mobile communication terminal.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a converter having a conduction loss, and a method for driving the same.

According to an exemplary embodiment of the present invention, a converter is provided. The converter includes: a transformer comprising a primary winding and a secondary winding; a first switch connected between a first end of the primary winding and a ground; a second switch connected between the first end of the primary winding and a second end of the primary winding, and complementarily switched with the first switch; a first output unit connected to the secondary winding; and a first switching controller controlling a first time that is a turn-on time of the first switch corresponding to a load connected to the first output unit.

The converter may further include a second switching controller that controls a second time that is a turn-off time of the first switch corresponding to an output voltage of the first output unit.

The first switching controller may control a frequency of the first switch to be increased as the load is decreased.

The first output unit may include a diode connected to the secondary winding, and the first switching controller may receive first information corresponding to a current flowing to the diode and may control the first time corresponding to the first information.

The first switching controller may control the first switch to be turned on at or right after a time at which the current flowing to the diode becomes a predetermined reference current.

The transformer may further include an auxiliary winding in a secondary side, the converter further comprises a second output unit connected to the auxiliary winding and including a diode of which an anode is connected to a first end of the auxiliary winding, and the first information may be an anode voltage of the diode.

The first switching controller may include a comparator comparing the anode voltage of the diode and a reference voltage, and an SR latch that receives an output of the comparator and outputs the turning-on signal for the first time corresponding to an output of the comparator.

The auxiliary winding may share the same ground with the primary winding.

When a turn ratio of the secondary winding and the auxiliary winding is 1:m, the reference voltage may be m times the output voltage of the first output unit.

The converter may further include a capacitor connected between a second end of the primary winding and the second switch.

When the second switch is turned on, a resonance may be generated between a leakage inductance of the transformer and the capacitor.

According to another exemplary embodiment of the present invention, a method for driving a converter is provided. The driving method may include: providing a first switch connected between a primary winding of a transformer and a ground; providing a second switch connected between both ends of the primary winding; sensing a current flowing through a first diode connected to a secondary winding of the transformer; and turning on the first switch and turning off the second switch at a first time at which the sensed current becomes a predetermined reference current.

The driving method may further include turning off the first switch and turning on the second switch corresponding to an output voltage of the converter.

The first time may be changed corresponding to an output load of the converter.

The first time may be more quickened as the output load is decreased.

The transformer may further include an auxiliary winding, and the sensing the current may include sensing an anode voltage of a second diode connected to the auxiliary winding and comparing the anode voltage of the second diode and a reference voltage. The sensing the current further comprises determining that a current flowing through the first diode is the predetermined reference current when the anode voltage of the second diode is lower than the reference voltage.

According to another exemplary embodiment of the present invention, a converter is provided. The converter may include: a transformer including a primary winding, a secondary winding, and an auxiliary winding; a first switch connected between a first end of the primary winding and a ground; a capacitor of which a first end is connected to a second end of the primary winding; a second switch connected between a second end of the capacitor and the first end of the primary winding, and complementarily switched with the first switch; a first output unit connected to the secondary winding; a second output unit including a diode connected to the auxiliary winding; and a first switching controller sensing a load connected to the first output unit through the anode voltage of the diode and controlling switching frequencies of the first and second switches according to the load.

The first switching controller may control the switching frequency to be increased as the load is decreased.

The first switching controller may include a comparator comparing the anode voltage of the diode and a reference voltage, and an SR latch receiving an output of the comparator and outputting a turn-on time of the first switch corresponding to the output of the comparator.

According to the exemplary embodiments of the present invention, an unnecessary conduction loss can be reduced by changing a switching frequency.

DETAILED DESCRIPTION OF THE EMBODIMENTS

Figure 1:
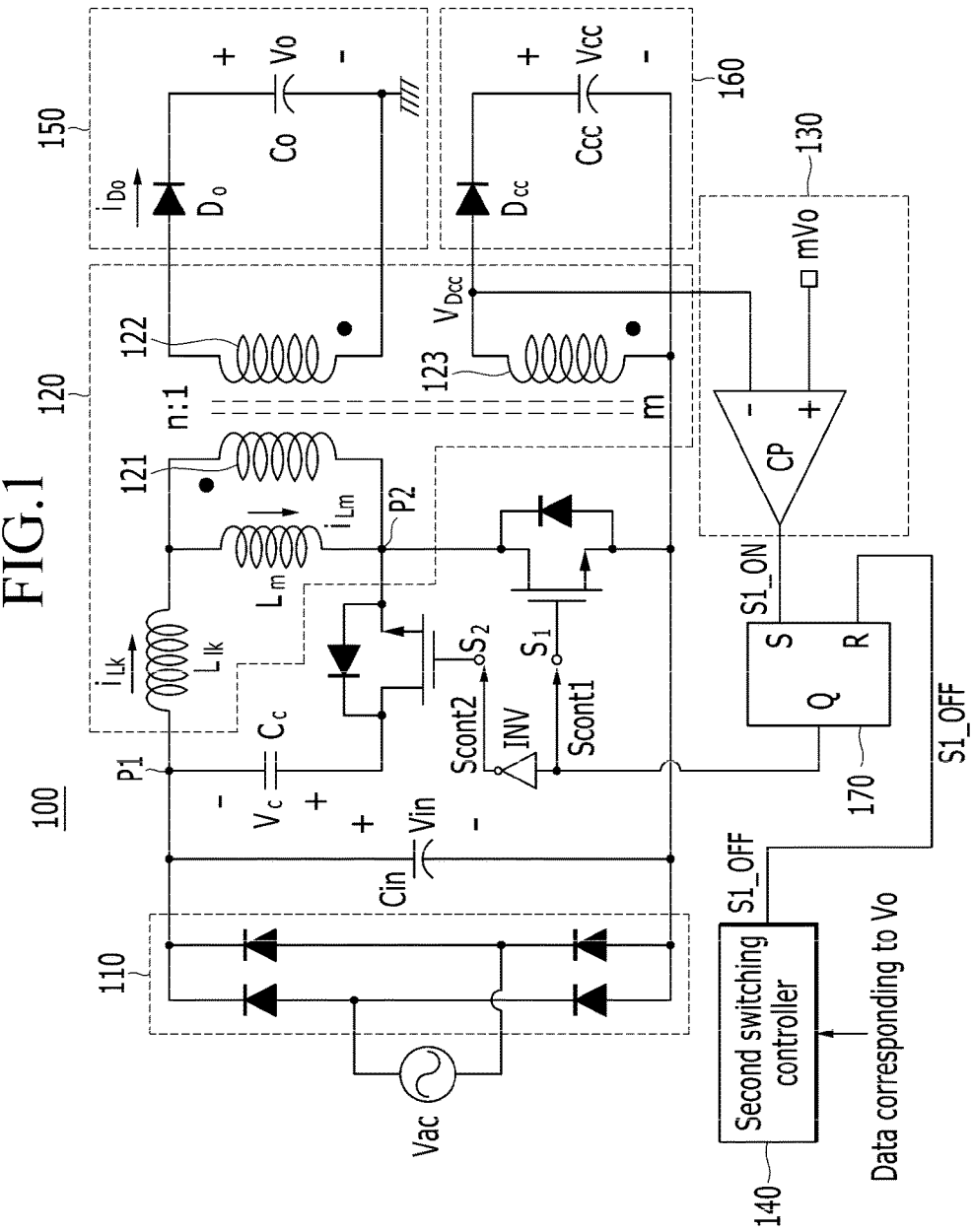
FIG. 1 shows a converter according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, a converter according to an exemplary embodiment of the present invention, and a driving method thereof will be described with reference to the accompanying drawings.

FIG. 1 shows a converter according to an exemplary embodiment of the present invention.

As shown in FIG. 1, a converter 100 according to the exemplary embodiment of the present invention includes a rectifier 110, an input capacitor Cin, a clamp capacitor Cc, a transformer 120, a main switch S1, a clamp switch S2, a first switching controller 130, a second switching controller 140, a first output unit 150, a second output unit 160, and an SR latch 170.

The rectifier 110 includes four bridge-type diodes, and rectifies an externally input AC voltage Vac. FIG. 1 illustrates full-bridge type diodes, but the diodes may be formed with various types such as a half-bridge type and the like.

The voltage rectified by the rectifier 110 is filtered by an input capacitor Cin, and a voltage between lateral ends of the input capacitor Cin becomes a DC voltage Vin having a small ripples.

The transformer 120 is formed of a primary winding and a secondary winding, and transmits energy applied to the primary winding to the secondary winding. FIG. 1 illustrates modeling of a case of substantial realization of a transformer. When a transformer is substantially realized, a leakage inductance and a magnetizing inductance are generated, and in FIG. 1, the leakage inductance is denoted by $L_{lk}$ and the magnetizing inductance is denoted by $L_m$. In addition, the transformers 121 and 123 are ideal transformers in which the leakage inductance and the magnetizing inductance are excluded. In FIG. 1, the primary winding 121 and the secondary winding 122 have a turn ratio of n:1 and the primary winding 121 and the auxiliary winding 123 has a turn ratio of n:m, but it is not restrictive.

In addition, a first primary terminal P1 of the transformer 120 is connected to a first end of the input capacitor Cin and a second end of the input capacitor Cin is connected to a ground. The main switch S1 is connected between a second primary terminal P2 of the transformer 120 and the ground.

A first end of the clamp capacitor Cc is connected to the first primary terminal P1 of the transformer 120, and the clamp switch S2 is connected between a second end of the clamp capacitor Cc and the second primary terminal P2 of the transformer 120.

In FIG. 1, the main switch S1 and the clamp switch S2 are illustrated as FETs, but may be replaced with other switching elements, such as BJT, IGBT, and the like.

The first output unit 150 is connected to the secondary winding 122, and includes a diode Do and a capacitor Co. An anode of the diode Do is connected to a first end of the secondary winding 122, and the capacitor Co is connected between a cathode of the diode Do and a ground (i.e., a secondary side ground). In addition, a voltage charged between both ends of the capacitor Co is a first output voltage Vo.

The second output unit 160 is connected to the auxiliary winding 123, and includes a diode Dcc and a capacitor Ccc. An anode of the diode Dcc is connected to a first end of the auxiliary winding 123, and the capacitor Ccc is connected between a cathode of the diode Dcc and a ground (i.e., a primary side ground). In addition, a voltage charged between both ends of the capacitor Ccc is a second output voltage Vcc.

The first switching controller 130 receives information corresponding to a current iDo flowing to the diode Do and outputs a control signal S1_ON that turns on the main switch S1. The control signal S1_ON that turns on the main switch S1 is input to a set terminal S of an SR latch 170. In further detail, the first switching controller 130 generates the control signal S1_ON to control the main switch S1 to be turned on at a time that the current iDo flowing to the diode Do becomes zero or right after the time. Here, the instant at which the current iDo flowing to the diode Do becomes zero is changed according to a load, and accordingly, the turn-on time of the main switch S1 is also changed according to the load.

Hereinafter, a method for the first switching controller 130 according to the exemplary embodiment of the present invention to generate the control signal S1_ON that turns on the main switch S1 by receiving the information corresponding to the current $i_{Do}$ flowing to the diode Do will be described in detail.

As shown in FIG. 1, the first switching controller 130 according to the exemplary embodiment of the present invention includes a comparator CP.

An inverting terminal (−) of the comparator CP is connected to the anode of the diode Dcc and a predetermined reference voltage is applied to a non-inverting terminal (+) of the comparator 130. In FIG. 1, the predetermined reference voltage is denoted by mVo, but it is not restrictive. The first switching controller 130 receives information corresponding to the current $i_{Do}$ flowing to the diode Do, and in the exemplary embodiment of FIG. 1, the first switching controller 130 indirectly receives the information of the current $i_{Do}$ through the second output unit 160. When the diode Do is forward-biased, the current $i_{Do}$ flows through the diode Do. In this case, an anode voltage of the diode Do becomes Vo (in this case, a forward voltage of the diode Do is neglected) and an anode voltage $V_{Dcc}$ of the diode Dcc becomes mVo by a turn ratio. Meanwhile, at a time that the current $i_{Do}$ is gradually decreased to zero, a positive voltage is applied in a dotted direction of the secondary winding 122 and thus an inverse voltage is applied to the diode Do. Thus, the anode voltage $V_{Dcc}$ of the diode Dcc becomes lower than mVo. As described, information of the current $i_{Do}$ flowing through the diode Do can be determined based on whether the anode voltage $V_{Dcc}$ of the diode Dcc is changed to be a lower voltage from mVo.

The comparator CP outputs a high signal when the anode voltage $V_{Dcc}$ of the diode Dcc is lower than mVo, and an output signal of the comparator CP is the control signal S1_ON that turns on the main switch S1.

As described, the first switching controller according to the exemplary embodiment of the present invention receives information corresponding to the current $i_{Do}$ through the second output unit 160 that uses the same ground as the primary side ground, and therefore no addition element such as a photo-coupler is required.

In FIG. 1, the first switching controller 130 of the present invention receives information corresponding to the current $i_{Do}$ through the second output unit 160, but the first switching controller 130 may directly receive the information of the current $i_{Do}$ through the first output unit 150. However, in this case, the primary side ground and the secondary side ground of the transformer 120 are different from each other, a photo-coupler may be required, and a method related thereto is known to a person skilled in the art. Therefore, no further description will be provided.

The second switching controller 140 receives information corresponding to the first output voltage Vo as a feedback, and outputs a control signal S1_OFF that turns off the main switch S1. That is, the second switching controller 140 generates and outputs the control signal S1_OFF that turns off the main switch S1 corresponding to the first output voltage Vo. In addition, the control signal S1_OFF that turns off the main switch S1 is input to a reset terminal R of the SR latch 170. The first output voltage Vo is regulated to a desired DC voltage by the turn-off time of the main switch S1. A method for the second switching controller 140 to generate the control signal S1_OFF by receiving information corresponding to the first output voltage Vo can be realized using a photo-coupler or a comparator or using the method of primary side regulating (PSR), and this is known to a person skilled in the art. Therefore, no further description will be provided.

The SR latch 170 receives the control signal S1_ON that turns on the main switch S1 through a set terminal S, receives the control signal S1_OFF that turns off the main switch S1 through the reset terminal R, and outputs a first switching control signal Scont1 that controls the main switch S1 through an output terminal Q. In addition, a second switching control signal Scont2 that controls the clamp switch S2 is an inverse signal of the first switching control signal Scont1 that controls the main switch S1. As shown in FIG. 1, the first switching control signal Scont1 is inverted by an inverter INV, and the inverted signal is the second switching control signal Scont2. Thus, the clamp switch S2 is turned off when the main switch S1 is turned on and turned on when the main switch S1 is turned off, interposing a constant dead time therebetween.

Next, a method for driving a converter according to the exemplary embodiment of the present invention will be described with reference to FIG. 2.

Figure 2:
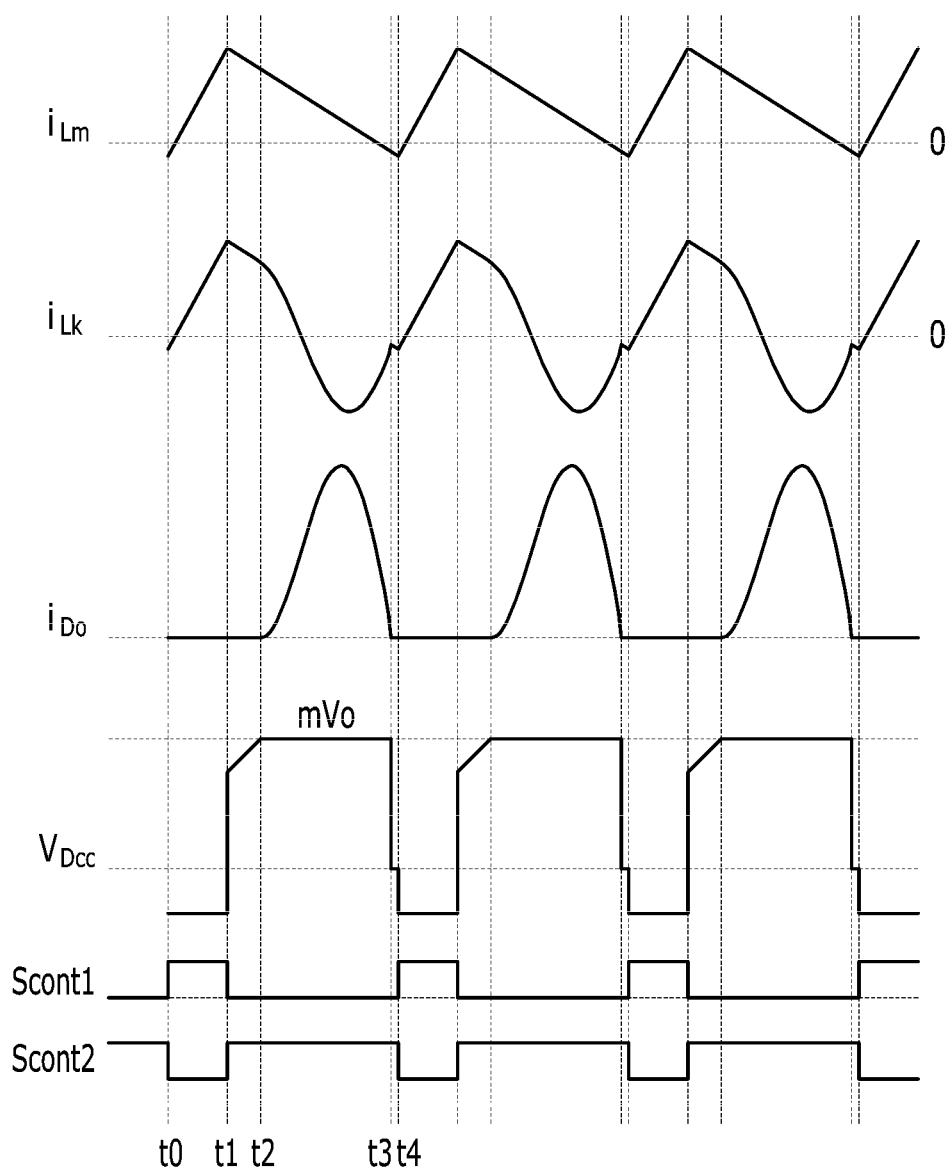
FIG. 2 shows signal waveforms of the converter according to the exemplary embodiment of the present invention.

FIG. 2 shows a signal waveform of the converter according to the exemplary embodiment of the present invention. FIG. 2 illustrates main signal waveforms for convenience in description of operation of the converter according to the exemplary embodiment of the present invention.

First, at t0, the first switching control signal Scont1 becomes high level and thus the main switch S1 is turned on. Then, a current path is formed through the input capacitor Cin, the leakage inductance $L_{lk}$, the magnetizing inductance $L_m$, and the main switch S1. As shown in FIG. 2, a current $i_{Lm}$ flowing through the magnetizing inductance $L_m$ is linearly increased through the current path. In addition, a current $i_{LK}$ flowing through the leakage inductance $L_{lk}$ is also linearly increased.

At t1, the first switching control signal Scont1 becomes low level and the second switching control signal Scont2 becomes high level. Accordingly, the main switch S1 is turned off and the clamp switch S2 is turned on. Then, from t1 to t2, the current $i_{Lm}$ flowing through the magnetizing inductance $L_m$ and the current $i_{LK}$ flowing through the leakage inductance $L_{lk}$ are linearly decreased. The t1 at which the first switching control signal Scont1 becomes low level is determined by the second switching controller 140.

Next, at t2 after a predetermined time period from t1, an LC resonance is generated between the clamp capacitor Cc, the leakage inductance $L_{lk}$, and accordingly the current $i_{LK}$ flowing through the leakage inductance $L_{lk}$ has a resonance waveform. Meanwhile, the current $i_{Lm}$ flowing through the magnetizing inductance $L_m$ is linearly decreased.

The current $i_{Do}$ flowing to the diode Do corresponds to a value acquired by subtracting the current $i_{LK}$ flowing to the leakage inductance $L_{lk}$ from the current $i_{Lm}$ flowing to the magnetizing inductance $L_m$. Thus, after t2, the current $i_{Do}$ flowing to the diode Do is gradually increased and then gradually decreased in the form of the resonance current. When the current $i_{Do}$ flows in such a manner (i.e., for a period from t2 to t3), the anode voltage of the diode Do becomes Vo and the anode voltage Dcc of the diode Dcc becomes mVo.

When the current $i_{Do}$ flowing to the diode Do is gradually decreased and thus becomes zero at t3, the anode voltage $V_{Dcc}$ of the diode Dcc is rapidly decreased to be lower than mVo. As shown in FIG. 1, the first switching controller 130 according to the exemplary embodiment of the present invention senses a time at which the current $i_{Do}$ flowing to the diode Do becomes zero through the anode voltage $V_{Dcc}$ of the diode Dcc and outputs the control signal S1_ON that turns on the main switch S1. When a propagation delay time is not considered, the first switching control signal Scont1 becomes high level and the second switching control signal Scont2 becomes low level at t3. However, as shown in FIG. 2, when the propagation delay time is considered or an intentional delay time is applied, the first switching control signal Scont1 becomes high level and the second switching control signal Scont2 becomes low level at t4.

Operation after t4 is the same as the operation during t0 to t4, and therefore no further description will be provided.

Meanwhile, in FIG. 2, the second switching control signal Scont2 is changed to high level at t1 at which the first switching control signal Scont1 is changed to low level and the second switching control signal Scont2 is changed to low level at t4 at which the first switching control signal Scont1 is changed to high level, but a predetermined dead time may be set between the first switching control signal Scont1 and the second switching control signal Scont2 in order to prevent occurrence of arm short.

As described, according to the exemplary embodiment of the present invention, switching frequencies of the main switch S1 and the clamp switch S2 are variable rather than being fixed. As described above, the turn-on time of the main switch S1 and the turn-off time of the clamp switch S2 are changed according to the current $i_{Do}$ flowing to the diode Do. The magnitude of the current $i_{Do}$ flowing to the diode Do is changed according to a load connected to the first output unit 150, and therefore the switching frequencies of the main switch S1 and the clamp switch S2 may be variable according to an output load.

Since the current $i_{Do}$ flowing to the diode Do is decreased when the output load is decreased, the turn-on time of the main switch S1 and the turn-off time of the clamp switch S2 are quickened. Thus, when the output load is decreased, the switching frequencies of the main switch S1 and the clamp switch S2 are increased.

The converter according to the exemplary embodiment of the present invention can reduce an unnecessary conduction loss by changing the switching frequency according to the output load. This will be described in detail with reference to FIG. 3 and FIG. 4.

Figure 3A:
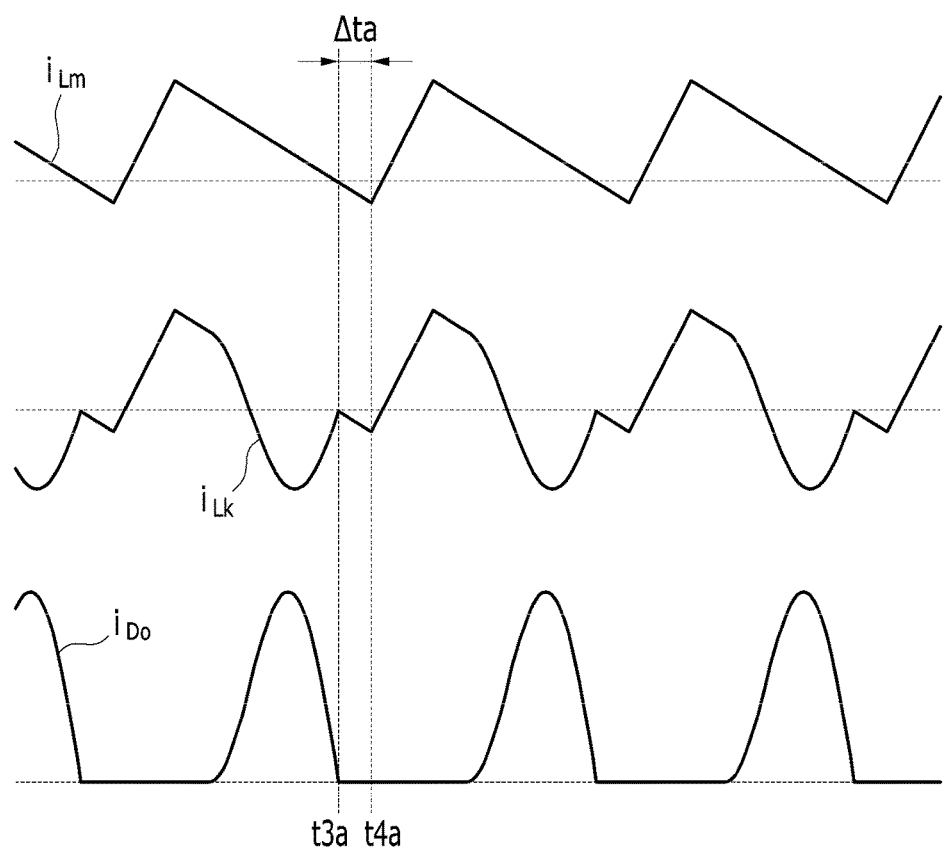
FIG. 3A shows signal waveforms of a case of application of a general method and FIG. 3B shows signal waveforms of a case of application of the exemplary embodiment of the present invention, in a case when a load is high.
Figure 3B:
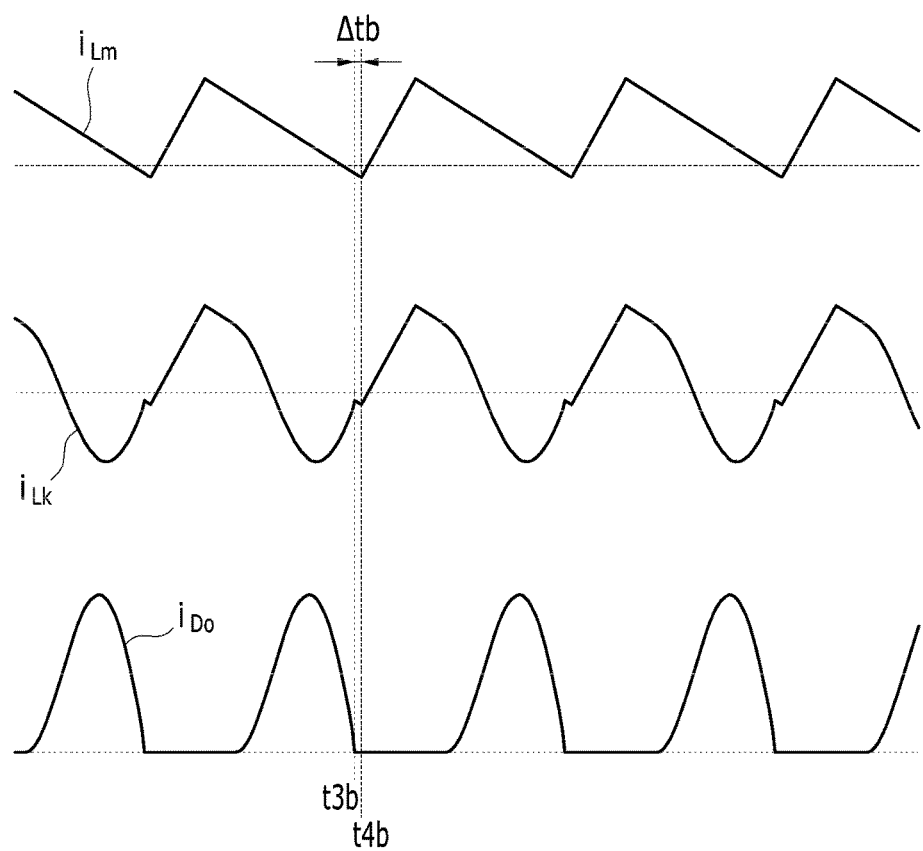

FIG. 3 shows signal waveforms for a case that a general method is applied and a case that the exemplary embodiment of the present invention is applied, in a case that a load is high. In further detail, FIG. 3A is signal waveforms of a case that a switching frequency is fixed like a general case, and FIG. 3B is signal waveforms of a case that a switching frequency is variable like the exemplary embodiment of the present invention.

As shown in FIG. 3A, in the general case, the main switch S1 is not turned on at t3a at which the current $i_{Do}$ flowing to the diode Do becomes zero. In the general case, the main switch S1 and the clamp switch S2 have fixed switching frequencies, and therefore the main switch S1 is turned on at a fixed time t4a. Thus, although the current $i_{Do}$ flowing to the diode Do becomes zero, the current $i_{Lm}$ flowing through the magnetizing inductance Lm continuously flows from t3a to t4a, that is, during Δta, and accordingly a conduction loss is increased.

Figure 4A:
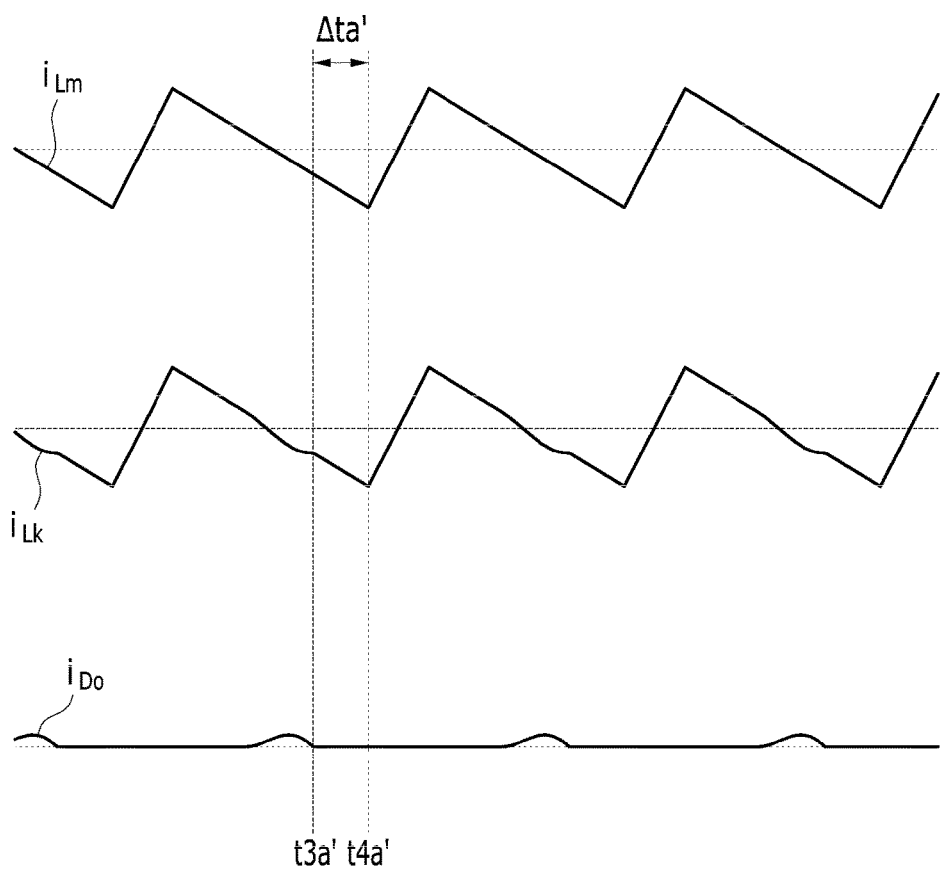
FIG. 4A shows signal waveforms of a case of application of a general method and FIG. 4B shows signal waveforms of a case of application of the exemplary embodiment of the present invention, in a case when a load is low.
Figure 4B:
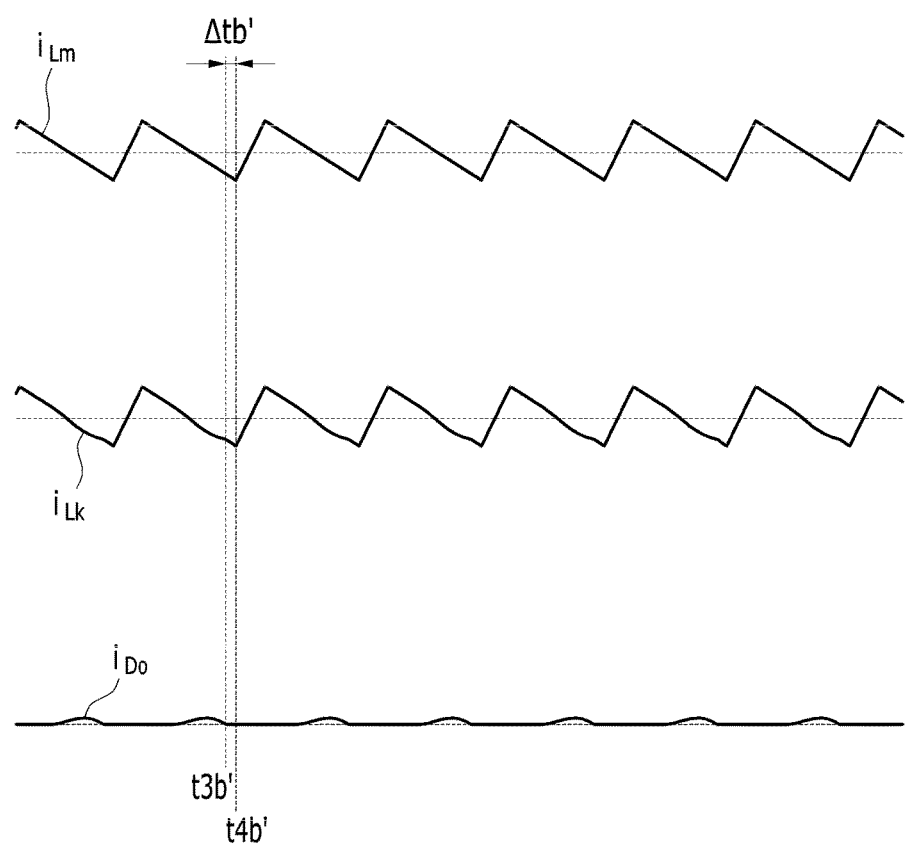

However, as shown in FIG. 4B, in case of the exemplary embodiment, the main switch S1 is turned on at t3b at which the current $i_{Do}$ flowing to the diode Do becomes zero. In FIG. 4B, the main switch S1 is turned on not at t3b but at t4b because of a propagation delay time. Thus, the current $i_{Lm}$ flowing through the magnetizing inductance $L_m$ flows only during the propagation delay time (denoted by Δtb in FIG. 3B), and the propagation delay time Δtb is a relatively short period of time compared to a fixed frequency method Δta so that the conduction loss can be reduced.

FIG. 4 shows signal waveforms of a case that a general method is applied and a case that the exemplary embodiment of the present invention is applied, in a case that a load is low. FIG. 4A shows signal waveforms of a case that a switching frequency is fixed like the general case, and FIG. 4B shows signal waveforms of a case that a switching frequency is variable like the exemplary embodiment of the present invention.

As shown in FIG. 4A, in the general case, the main switch S1 is not turned on at t3a' at which the current $i_{Do}$ flowing to the diode Do becomes zero. In the general case, the main switch S1 and the clamp switch S2 have fixed switching frequencies, and therefore the main switch S1 is turned on at a fixed time t4a'. Thus, the current $i_{Lm}$ flowing through the magnetizing inductance $L_m$ continuously flows from t3a' to t4a', that is, during Δta' even though the current $i_{Do}$ flowing to the diode Do becomes zero, and accordingly, a conduction loss is increased.

However, as shown in FIG. 4B, in case of the exemplary embodiment, the main switch S1 is turned off at t3b' at which the current $i_{Do}$ flowing to the diode Do becomes zero. In FIG. 4B, the main switch S1 is turned on not at t3b' but at t4b' because of a propagation delay time. Thus, the current $i_{Lm}$ flowing through the magnetizing inductance $L_m$ flows only during the propagation delay time (denoted by Δtb' in FIG. 4B), and the propagation delay time Δtb' is a relatively short period time compared to a fixed frequency method Δta' so that the conduction loss can be reduced.

As described, as shown in FIG. 3 and FIG. 4, the main switch S1 is turned on and the clamp switch S2 is turned off at the time at which the current $i_{Do}$ flowing to the diode Do becomes zero and accordingly the conduction loss can be reduced and high efficiency can be acquired.

Meanwhile, since the amount of current $i_{Do}$ flowing to the diode Do is low compared to a case that the output load is high as shown in FIG. 4A compared to a case that the output load is low as shown in FIG. 4B, and therefore the time at which the current $i_{Do}$ flowing to the diode Do is quickened. Therefore, the switching frequency is more increased as the output load is decreased in the exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A converter comprising:
   a transformer comprising a primary side including at least a primary winding and a secondary side including at least a secondary winding;
   a main switch connected between a first end of the primary winding and a ground;
   a clamp capacitor and an active-clamp switch connected between the first end of the primary winding and a second end of the primary winding;
   a first output unit connected to the secondary winding; and a first switching controller configured to vary a switching frequency of the active-clamp switch corresponding to a load connected to the first output unit, to turn on the main switch in response to detection of zero-crossing of a current flowing to a diode on the secondary winding, and to complementary switch the main switch and the active-clamp switch.

2. The converter of claim 1, further comprising a second switching controller that controls a turn-off time of the main switch corresponding to an output voltage of the first output unit.

3. The converter of claim 1, wherein the first switching controller controls a frequency of the main switch to be increased as the load is decreased.

4. The converter of claim 1, wherein the first output unit comprises the diode, and the first switching controller receives first information corresponding to the current flowing to the diode.

5. The converter of claim 4, wherein the first switching controller controls the main switch to be turned on at or right after a time at which the current flowing to the diode becomes a predetermined reference current.

6. The converter of claim 4, wherein the transformer further comprises an auxiliary winding in a secondary side, the converter further comprises a second output unit connected to the auxiliary winding and including a diode of which an anode is connected to a first end of the auxiliary winding, and the first information is an anode voltage of the diode connected to the auxiliary winding.

7. The converter of claim 6, wherein the first switching controller comprises:
  a comparator configured to compare the anode voltage of the diode and a reference voltage; and
  an SR latch configured to receive an output of the comparator and output a turning-on signal corresponding to an output of the comparator.

8. The converter of claim 7, wherein the auxiliary winding shares the same ground with the primary winding.

9. The converter of claim 7, wherein when a turn ratio of the secondary winding and the auxiliary winding is 1:m, the reference voltage is m times the output voltage of the first output unit.

10. The converter of claim 1, wherein, when the active-clamp switch is turned on, a resonance is generated between a leakage inductance of the transformer and the capacitor.

11. A method for driving a converter comprising:
  providing a main switch connected between a primary winding of a transformer and a ground;
  providing a clamp capacitor and an active-clamp switch connected between a first end of the primary winding and a second end of the primary winding;
  sensing a current flowing through a first diode connected to a secondary winding of the transformer;
  turning on the main switch in response to sensing zero-crossing of the current flowing through the first diode;
  complementary switching the main switch and the active-clamp switch; and
  varying a switching frequency of the active-clamp switch corresponding to a load.

12. The method for driving the converter of claim 11, further comprising turning off the main switch and turning on the active-clamp switch corresponding to an output voltage of the converter.

13. The method for driving the converter of claim 11, wherein a first time at which the main switch is turned on and the active clamp switch is turned off is changed corresponding to an output load of the converter.

14. The method for driving the converter of claim 13, wherein the switching frequency is increased as the output load is decreased.

15. The method for driving the converter of claim 11, wherein the transformer further comprises an auxiliary winding, and the sensing the current comprises:
  sensing an anode voltage of a second diode connected to the auxiliary winding and
  comparing the anode voltage of the second diode and a reference voltage.

16. The method for driving the converter of claim 15, wherein sensing the current further comprises determining that a current flowing through the first diode is the predetermined reference current when the anode voltage of the second diode is lower than the reference voltage.

17. A converter comprising:
  a transformer comprising a primary side including at least a primary winding, a secondary side including a secondary winding, and an auxiliary winding;
  a main switch connected between a first end of the primary winding and a ground;
  a clamp capacitor and an active-clamp switch connected between the first end of the primary winding and to a second end of the primary winding;
  a first output unit connected to the secondary winding;
  a second output unit including a diode connected to the auxiliary winding; and
  a first switching controller configured to sense a load connected to the first output unit through the anode voltage of the diode and configured to control a switching frequency of the active-clamp switch according to the load, to turn on the main switch in response to zero-crossing of a current flowing through a diode connected to the secondary winding, and to complementary switch the main switch and the active-clamp switch.

18. The converter of claim 17, wherein the first switching controller controls the switching frequency to be increased as the load is decreased.

19. The converter of claim 17, wherein the first switching controller comprises:
  a comparator configured to compare the anode voltage of the diode connected to the auxiliary winding and a reference voltage; and
  an SR latch receiving an output of the comparator and outputting a turning-on signal for a turn-on time of the main switch corresponding to the output of the comparator.

* * * * *